United States Patent [19]
Mintzer

[11] Patent Number: 5,297,289
[45] Date of Patent: Mar. 22, 1994

[54] SYSTEM WHICH COOPERATIVELY USES A SYSTOLIC ARRAY PROCESSOR AND AUXILIARY PROCESSOR FOR PIXEL SIGNAL ENHANCEMENT

[75] Inventor: Lester Mintzer, Santa Ana, Calif.

[73] Assignee: Rockwell International Corporation, Seal Beach, Calif.

[21] Appl. No.: 430,835

[22] Filed: Oct. 31, 1989

[51] Int. Cl.⁵ .............................................. G06F 15/20
[52] U.S. Cl. ................................ 395/800; 364/931.01; 364/931.02; 364/931.03; 364/927.3; 364/DIG. 2
[58] Field of Search ................ 395/100, 800, 200; 364/786

[56] References Cited

U.S. PATENT DOCUMENTS

| | | | |
|---|---|---|---|
| 4,314,349 | 2/1982 | Batcher | 364/900 |
| 4,716,414 | 12/1987 | Luttrell | 342/179 |
| 4,785,818 | 11/1988 | Hardin | 358/112 |
| 4,790,026 | 12/1988 | Gennery | 382/49 |
| 4,809,347 | 2/1989 | Nash | 382/49 |
| 4,823,281 | 4/1989 | Evangelisti | 364/900 |
| 4,827,445 | 5/1989 | Fuchs | 364/900 |
| 4,858,177 | 8/1989 | Smith | 395/800 |
| 4,860,248 | 8/1989 | Lumelsky | 364/900 |
| 4,873,515 | 10/1989 | Dickson | 340/728 |
| 4,949,390 | 8/1990 | Iverson | 382/49 |

*Primary Examiner*—Thomas C. Lee
*Assistant Examiner*—Eric Coleman
*Attorney, Agent, or Firm*—H. Fredrick Hamann; George A. Montanye; David J. Arthur

[57] ABSTRACT

A Lofargram Enhancement System having a processor having 1 to i rows and 1 to j columns of processing elements or data cells. Each data cell has a location corresponding to an index, a computational capability and a memory means for storing a a pixel intensity value. The memory cells of all processing elements are addressed concurrently. A FIFO receives and stores a scan line comprising a sequence of pixel intensity signal values. A program provides a means for calculating row and column total values for the total of the pixel intensity signal values stored in a predetrmined relationally related location for each respective processing element for each respective processing element in the systolic processor. An auxiliary processor reads the respective row total and column totals for each processing element in the jth column of the systolic processor and loads the corresponding first column processing element with a corrected pixel value. Column selection and timing and control circuit shifts the contents of the bottom row of corrected pixel values into an Output FIFO for delivery to a recorder as a scan line of data, and sequentially right shifts the systolic array one column to the right and actuates the auxiliary processor to calculate and enter corrected pixel values in each first column processing element, until all corrected pixel values are stored in the respective processing elements, the pixel intensity values in the bottom rightmost processing element being loaded into an output FIFO as each corrected pixel value is entered. The data stored in all processing elements being down row shifted in preparation for then receiving the next scan line of data.

8 Claims, 4 Drawing Sheets

SYSTEM WHICH COOPERATIVELY USES A SYSTOLIC ARRAY PROCESSOR AND AUXILIARY PROCESSOR FOR PIXEL SIGNAL ENHANCEMENT

FIELD OF THE INVENTION

The invention lofargram enhancement system relates to the field of Acoustic Signal Detection and more particularly to the field of detecting narrow band sonar signals in applications such as Acoustic Signal Processing as used in detecting torpedoes or other moving targets in an ocean environment. The invention lofargram enhancement system is installed in the signal path between a signal processing system, such as a torpedo alerting system, and an output display device, such as a CRT or chart recorder equipped for lofargram display. The lofargram enhancement system operates on the signal received to further enhance the information before the information is actually displayed on the CRT or the chart recorder. Installation of the lofargram enhancement system can be accomplished with any prior detection system designed to use conventional CRT displays or chart recorders to display lofargrams for the purpose of deriving the benefit of new or advanced signal processing techniques on the scan line data to obtain a further enhancement of the image to be displayed without experiencing the cost or delay associated with redesigning the Surface Ship Alerting System (SSAS) or acoustic signal processing system.

PRIOR ART

The Lofargram Enhancement System is installed as a system adjunct component in a signal processing system which receives analog signals from passive sonar arrays. To obtain the direction of a target of interest, signals from arrays of detectors are optionally beam formed and then analyzed for their spectral content. The received signal power for each frequency of interest is integrated and the digitized value of power for each frequency range is recorded for each time interval integration.

The interval selected for integration for a Surface Ship Alerting Systems is typically 0.8 second. Each integration value is recorded in a memory location associated with a frequency called a BIN. A typical Surface Ship Alerting System monitors a spectral range of several kilohertz. Thousands of values of integration data must be stored with each passing second for each of the frequency bands or bins for which integration is performed.

The sound of torpedoes can be detected at great distances, but confirmation is dependent on the Surface Ship Alerting System ability to analyze and display the values of signal power recorded for each frequency or BIN over relatively long intervals in time.

Prior art systems such as the AN/BQQ-9 or the AN/SQQ-89 made this data available by storing all of the data acquired over a period exceeding the possible interval of interest. Early prior art systems required interpretation by a skilled operator which had slow reaction time due to operator workload. The data for each integration interval depicting the existence or nonexistance of sound at each frequency over the bandwidth of interest was outputted to a chart recorder as a horizontal line as the paper advanced. Each succesive point on the line represented a slightly higher or lower frequency. The intensity of the line at each point represented the amplitude of the sound at that frequency. Once the alerting system was installed in a ship, redesign was required to install advanced or new filters to further enhance the data being delivered to the CRT displays or chart recorders.

The invention Lofargram Enhancement System improves the efficiency of a Surface Ship Alerting System by thinning out or reducing noise in the data being recorded and by connecting broken or interrupted track or line data prior to display. Economy is achieved by simplifying the installation of the advanced algorithms without major system redesign and by clarifying the data being depicted on the lofargram by the Surface Ship Alerting System for more precise interpretation by the operator, making earlier detection possible.

SUMMARY OF THE INVENTION

The Lofargram Enhancement System receives scan signals from a Surface Ship Alerting System before the signals are displayed. The signals for a scan line are formated as a sequence of digital values, each digital value representing the signal amplitude or signal power at each sequentially higher frequency along the scan line. Each scan line is divided into a predetermined number of cells, each cell representing a discrete frequency bin or value within the bandwidth of interest. A typical scan line might be created with 512 pixel data values. The location of each pixel across the scan is associated with a frequency and each pixel location is called a BIN. Two or three scan lines of data might be received per second.

Each scan line of data is loaded into an input FIFO for temporary storage as the data values arrive in real time. A section of the total scan line may be selected for enhancement. The scan data is formated to arrive at a rate compatible with insertion into a memory map for a CRT display or at a rate compatible with the modulation of the scanning stylus on a chart recorder.

Once the Input FIFO is loaded, all data values in the Input FIFO are transferred in serial or parallel fashion into the serially or edge connected top row of a processor comprised of a predetermined number of systolic arrays. Each systolic array has X columns of processing elements and Y rows of processing elements. A typical systolic array, such as the NCR Geometric Arithmetic Parallel Processor is a 12 column by six row array. Each processing element in each array resides at an address that is accessible to all other elements in the array under micro code control. All processing elements in each array are simultaneously accessible to contiguous neighbors. Each processing element contains memory provisions for storing a predetermined number of parameter data values, such as a pixel value. a row average value, and a column average value and each element is capable of performing a predetermined programmable sequence of mathematical operations on internally stored data values and the data values obtained from neighboring elements concurrently with the same sequence of programmed mathematical operations being performed in all other processing elements. At the conclusion of each mathematical program sequence, the systolic array is programmed to sequentially column shift the contents of all elements to the right thereby sequentially moving all data values in each respective element through the rightmost column of processing elements.

An Auxilliary Processor samples the data values in each respective rightmost column element with each sequential right column shift. The Auxiliary Processor executes a program for processing the data values in each rightmost processing element. The program performs a decision making and higher order modifications of the pixel data value for each rightmost column element. At the conclusion of each Auxiliary Processor program cycle, the pixel data are loaded into the Output FIFO and the contents of all data values within each rightmost processing element are circulated and written into the corresponding row processing element locations in the leftmost column of processing elements. The sequence of right column shifts followed by circulating data values into the left most column processing elements progresses until the entire array of processing elements are restored to their original indexed locations.

At the conclusion of each scan cycle, the pixel intensity values for each processing element are down row shifted in anticipation of the next scan line of data to be loaded from the Input FIFO. The pixel values stored in the Output FIFO are shifted out at a rate compatible with the stylus rate on the recorder to control the intensity of each pixel as the enhanced section of the scan line is drawn.

DESCRIPTION OF PREFERRED EMBODIMENT

Figure 1:
FIG. 1 is a block diagram of a conventional sonar processing system coupled to a Lofargram Recorder.
Figure 2:
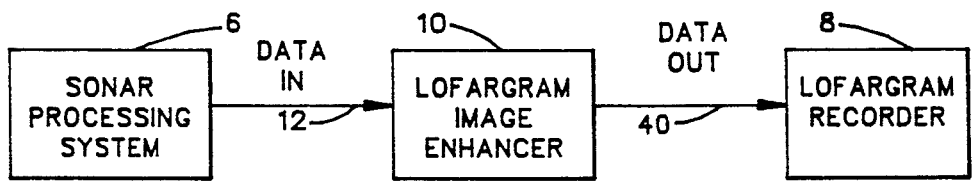
FIG. 2 is a block diagram of the sonar processing system of FIG. 1 with a block representing the invention Image Enhancement System interposed between the Lofargram Recorder and the Sonar Processing System

FIG. 1 is a block diagram that shows a conventional Surface Ship Alerting System or sonar processing system 6 coupled to a Lofargram Recorder 8. FIG. 2 is a block diagram that shows FIG. 1 modified with the insertion of the invention Lofargram Enhancement System 10 inserted into the input signal bus 12, between the sonar processing system 6 and the Lofargram Recorder. Digital data denoting gray scale values in 4 to 6 bit words are sent via input signal bus 12 from sonar processing system 6 to the Lofargram Enhancement System 10.

Sonar signal processing systems such as a sonar processing system 6, are typically capable of providing several types of signal data to recorders. These signals include signals such as Short Term Integrated Data (STI data), Long Term Integrated Data (LTI data), Enhanced STI data and Established Track data from a track pool or memory system within the sonar processing system.

Each type of signal data that is selected for display on a recorder is formatted for independent display on the chart recorder. Time is the independent variable as the chart continues to feed paper. The data is formated for scan line display where each scan line is created or written on the chart media as a series of dots or pixels, each pixel having a grey scale value ranging from white to black or from red to blue in color or both. A typical recorder would be plotting one to three scan lines per second, each scan line being made up of a predetermined number of pixels, each pixel being separated by an equal distance from the next pixel on the scan line. The data rate at which pixel values are sent to the recorder is typically 5000 pixels per second.

A typical recorder speed might be set to feed one inch of paper per minute, with as many as 60 scan lines being written in a stacked arrangement on the paper as the paper moves during the one minute interval. The image created by this process provides a historical record of the data and is conventionally referred to as a Lofargram. The format for the data for each scan line is referred to as LOFAR format. Lofargrams presenting a time history of hydrophone spectral content are a standard means of observing narrowband signals.

The pixel location at each point on a scan line is referred to as a BIN. Each bin is normally associated with a particular center frequency. A recorder stylus plots successive points as it moves across the moving chart depicting the presence and amplitude of signal power at successively higher frequencies. When the received signal from the sonar processing system 6 contains signal power level at a particular frequency for a continuous interval in time, the display records the value of the higher intensity of the signal as a series of darker dots at that BIN location, one dot being recorded for each consecutive scan line. The image produced by the dots at that BIN location over a period of time as the chart paper continues to move form a longitudinal line that extend with time. The lines thus formed at different BINS are referred to as tracks. The lateral position of the tracks varies slightly in time as a function of changes in the frequency of the narrow band signal being sensed.

The signals from the sonar processing system 6 are typically low level signals that are imbedded in noise, making their detection difficult and time consuming. The invention Lofargram Enhancement System 10 applies enhancement to the scan data to produce enhanced data which is then outputted to the recorder to produce enhanced lofargrams that the observer interprets with less effort, greater speed and accuracy.

Figure 3:
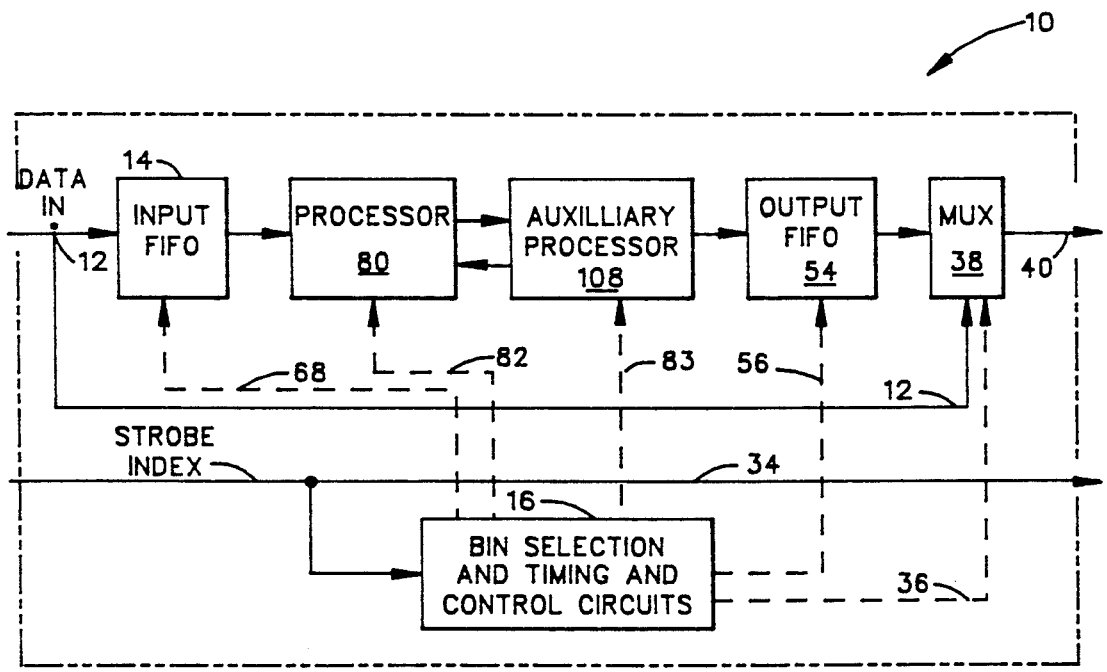
FIG. 3 is an expanded block diagram of the Lofargram Enhancement System.

FIG. 3 is a block diagram of the invention Lofargram Enhancement System 10. Input FIFO 14 operates under the control of the BIN SELECTION AND CONTROL CIRCUITS 16. The combination of Input FIFO 14 and the BIN SELECTION AND CONTROL CIRCUITS 16 represents a means for receiving and storing a scan line of data from the input signal bus 12 from the sonar processing system 6. The data representing the intensity of BIN or pixel locations is passed along the input signal bus 12 and stored in the Input FIFO 14 at a rate compatible with a Lofargram Recorder 8.

The signals received on the input signal bus 12 are typically 4 to 8 bit data values in a predetermined format acceptable to the LOFARGRAM RECORDER 8. The data values arrive consecutively for consecutive BIN or pixel positions and represent a sequence of pixel intensity signal values.

Processor 80 represents a horizontal array of individual, edge connected 6 by 12 by 8 programmable systolic array processors. The individual systolic array processors are typically semiconductor devices such as the NCR Geometric Arithmetic Parallel Processor (GAPP) device from the NCR Corporation at Colorado Springs, Colo., or the recently developed Distributed Array Processor (DAP), Series 500, device by Advanced Memory Technology of Irvine Calif.

Figures 4, 5:
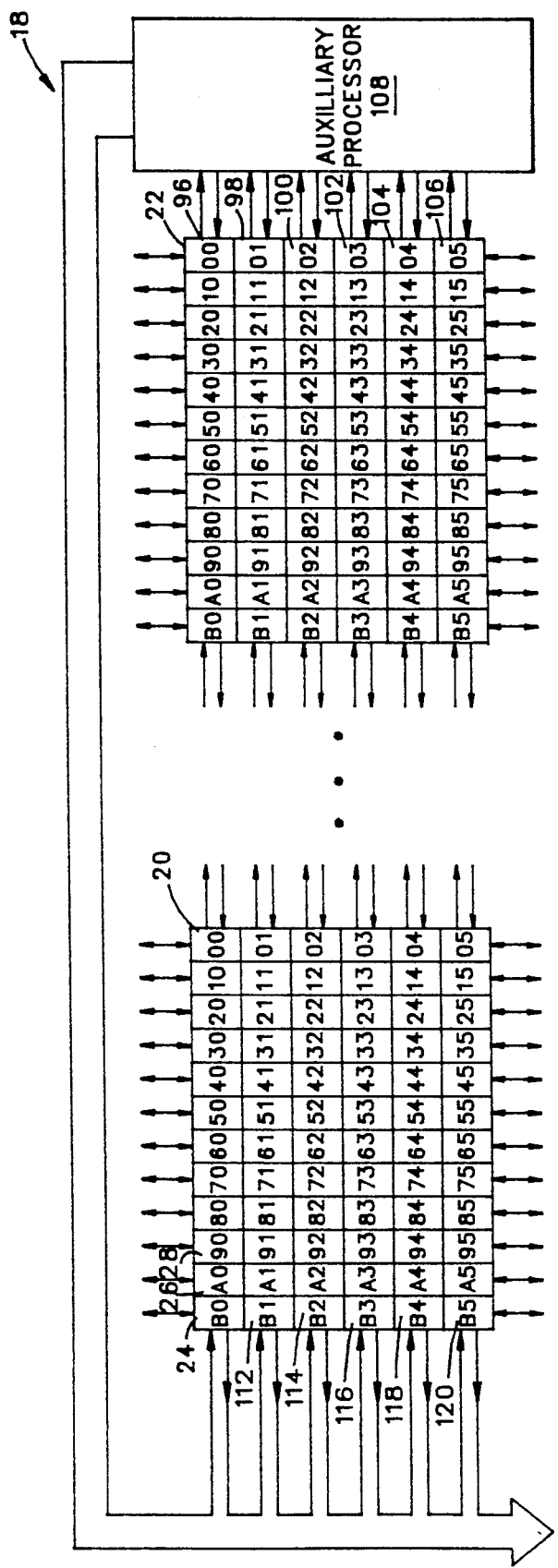
FIG. 4 is a block diagram of a Systolic Processor within the Lofargram Enhancement System, the Systolic Processor being comprised of a horizontal array of edge connected systolic array devices or elements.
FIG. 5 is a block diagram of a pair of edge connected systolic array devices, showing the column and row processing element locations that are sampled for a spoke filter for processing element 50.

FIG. 4 is a block diagram that depicts the horizontal array of edge connected systolic array processors 20, 22 forming i rows and j columns of processing elements, such as systolic array processing elements 24, 26, 28. Each processing element within a systolic array processor has a programmable location or address that appears as a two digit integer shown within the rectangle that represents the respective location of the processing element, such as the rectangles representing processing elements 24, 26. 28. The processor 80 of FIG. 4, as shown, has i=6 rows and an unspecified number of columns j.

The range of index j corresponds to the number of BINS or pixels to be displayed on each scan of a recorder stylus (not shown). Each processing element 24, 26 has a computational capability and a memory means for storing an input data value characterizing at least a pixel intensity value. The memory of all processing elements are addressed concurrently to permit parallel processing. Processing elements can access and read the data contained in contiguous processing elements.

Data values characterizing the intensity of respective pixels are transferred from the Input FIFO 14 to corresponding first row locations in the signal processor 20 such as locations B0, A0 . . . 00 in the first row of systolic array processor 20.

FIG. 5 identifies two horizontal arrays and a vertical array of processing elements by hatching. The systolic array processors 20, 22 are programed to provide a spoke filter for each processing element in the first row designated by hexadecimal cells B0 - 00 in each respective systolic array processor. By way of example, the program followed by processing element 50 in the top row of systolic array processor 20 includes the steps of adding the values of pixel intensity stored in cells 90, 80 and 70 to the pixel intensity values of cells 50, 30, 20 and 10 to obtain a horizontal total. The horizontal total thus obtained is then stored as a current horizontal total within the memory of processing element 50. The cell values of 60 and 40 are omitted to prevent the effect of noise, if present at BIN 50, from spreading over into the adjacent BIN frequencies.

The spoke filter associated with processing element 50 also adds the pixel intensity values of cells 50, 51, 52, 53, 54 and 55 to obtain a comparable vertical total. Each processing element in the top row follows a program that addresses a set of horizontal and vertical cells that are relationally equivalent to those used in the example for cell 50. The respective associated arrays are relationally positioned with respect to the subject cell in the top row to provide relationally equivalent horizontal and vertical totals. By way of example, cells B0, A0, 90 70 50 40 and 30 would be added for the horizontal total for cell 70 and cells 70, 71, 72, 73, 74 and 75 are added for the vertical total for cell 70.

The processor 20, operating under the control of a program such as the program described, thereby represents a means for calculating a row total value for the pixel intensity signal values stored in a predetermined relative row array for each respective processing element and for calculating a column total value for the average of the pixel intensity signal values stored in a predetermined relative column array for each respective processing element in the systolic processor. In the preferred embodiment, the same number of horizontal pixel values are summed as are vertical pixel values. Each horizontal total and each vertical total for each respective top row processing element is then treated as a respective horizontal average and a respective vertical average by scaling the associated pixel intensity value up by a factor corresponding to the number of processing elements accessed in calculating the respective horizontal total.

Figure 6:
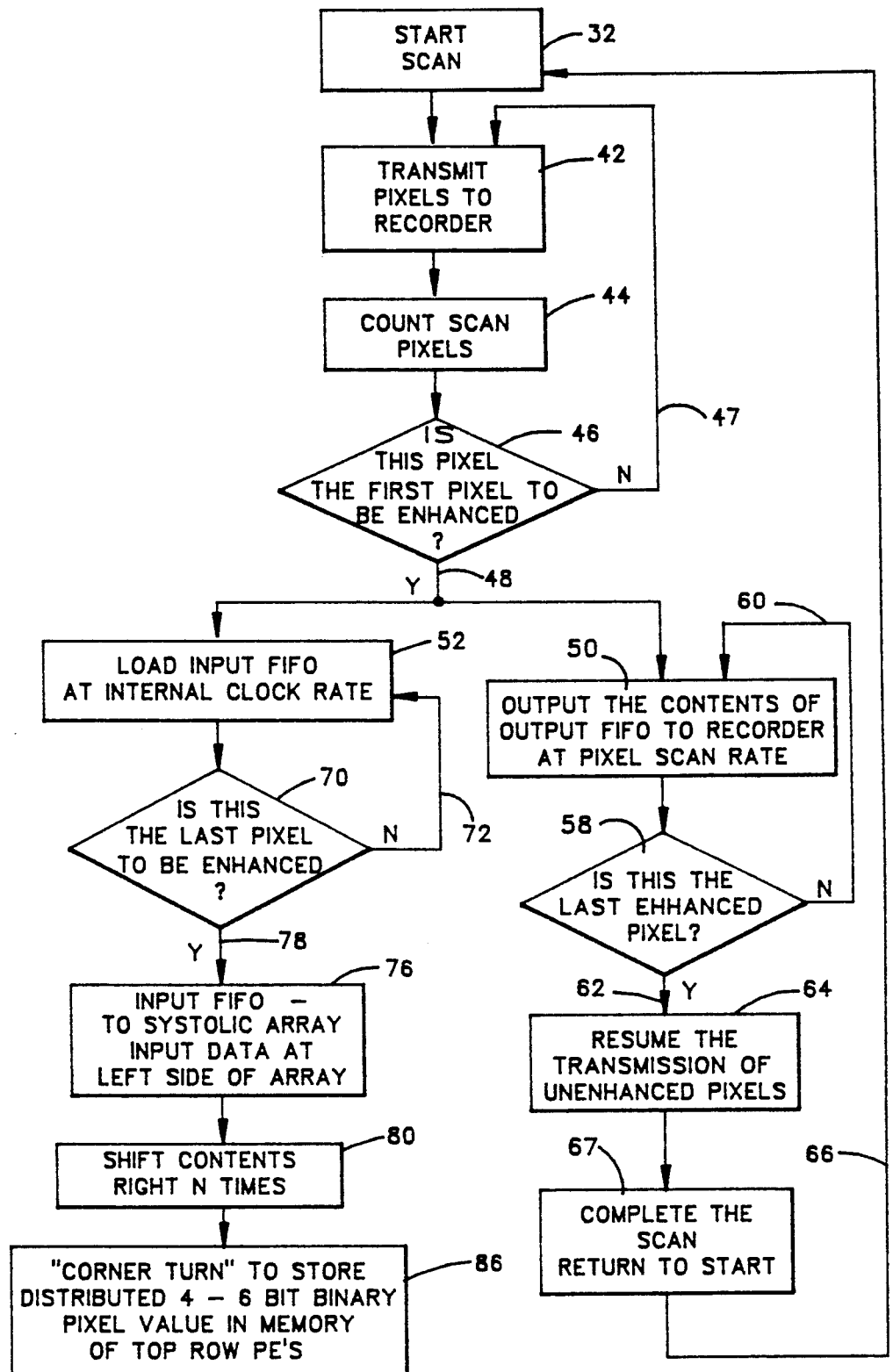
FIGS. 6-7 are flow charts for the sequence of operations in a scan cycle.
Figure 7:
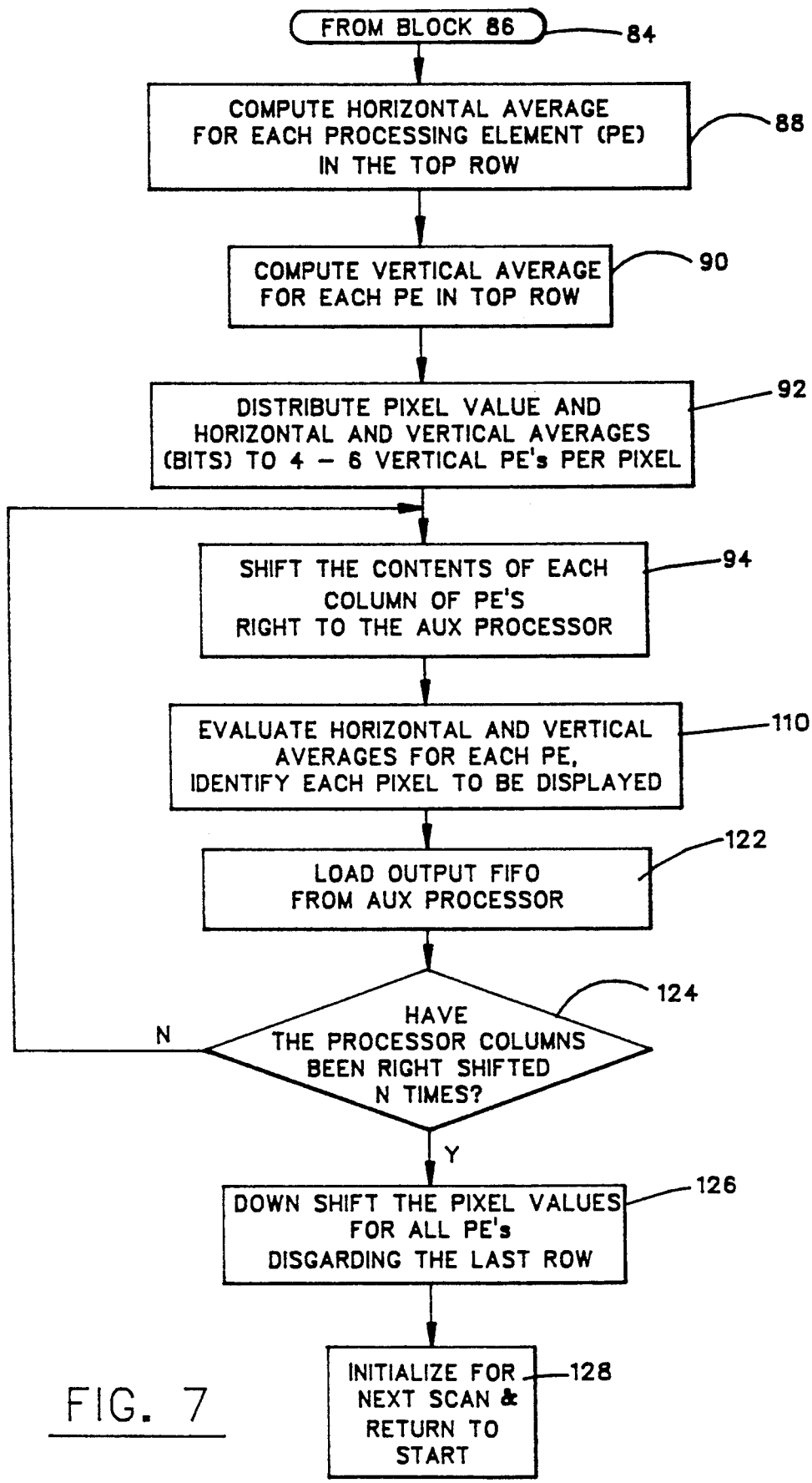

FIGS. 6 and 7 show the steps in a single scan operation and will be explained with reference to the system block diagram of FIG. 3. The START SCAN block 32 represents the start of the operation in which the BIN SELECTION AND TIMING AND CONTROL MEANS 16 begins the scan by receiving a strobe or sync signal from the sonar processing system 6 on strobe index signal path 34 that signals the transmission of the data for the first BIN. The BIN SELECTION AND TIMING AND CONTROL MEANS 16 advances to the TRANSMIT PIXELS TO RECORDER state represented by block 42 and sends a MUX control signal via the MUX Control Signal Path 36 to MUX 38 to direct the MUX to connect the input signal bus 12 to the output signal bus 40. The TRANSMIT PIXELS TO RECORDER block 42 represents the operation of the MUX 38 in connecting the input signal bus 12 to the output signal bus 40 to transmit pixel values to the Lofargram Recorder 8.

The BIN SELECTION AND TIMING AND CONTROL MEANS 16 advances to the COUNT SCAN PIXELS block 44 to increment a BIN counter with the arrival of each successive pixel value from the sonar processing system 6. The BIN counter value is compared with a predetermined operator selected BIN count value by operation of the IS THIS THE FIRST PIXEL TO BE ENHANCED decision block 46. If the decision is no, the BIN SELECTION AND TIMING AND CONTROL MEANS 16 returns via signal line 47 to the TRANSMIT PIXELS TO RECORDER block 42 and sends the next pixel value to the Lofargram Recorder 8.

If a sufficient number of pixel values have been received to indicate that the next pixel value to be received will be the first pixel value to be enhanced, then the BIN SELECTION AND TIMING AND CONTROL MEANS 16 advances via the YES decision path 48 to THE OUTPUT THE CONTENTS OF OUTPUT FIFO TO RECORDER AT PIXEL SCAN RATE, block 50 and concurrently to the LOAD INPUT FIFO AT INTERNAL CLOCK RATE block 52.

Block 50 represents the operation altering the MUX control signal via signal path 36 to MUX 38 to connect the output of the Output FIFO 54 to the output signal bus 40 to transmit pixel values to the Lofargram Recorder 8. The BIN SELECTION AND TIMING AND CONTROL MEANS 16 provides a control signal to the Output FIFO via signal path 56 to match the output rate of the Output FIFO to the scan rate of the Lofargram Recorder 8. After shifting each pixel intensity value from the Output FIFO 54, the IS THIS THE LAST ENHANCED PIXEL? block 58 determines if the pixel value being sent to the recorder is the last. If the value being sent is not the last, the control means 16 follows signal path 60 back to an alternate entry point into block 50 in preparation for transferring the next pixel intensity value. If the pixel value being transmitted is the last value in the Output FIFO 54 to be transmitted, the control means 16 advances via YES signal path 62 to the RESUME TRANSMISSION OF UNENHANCED PIXELS, block 64 to direct the MUX to select the input signal bus 12 to couple unenhanced pixel values to the Lofargram recorder for the remainder of the scan. At the conclusion of the scan, the control means 16 leaves box 67 via signal path 66 to return to the start of the scan program at the entry to box 42.

Concurrent with the process of reading out pixel intensity values from the Output FIFO 54, the control means 16 provides control signals via signal path 68 to the Input FIFO 14 to load pixel values (Block 52, FIG. 6) to be enhanced into the Input FIFO 14 at a normal recorder scan rate. The control means 16 determines if the pixel value being received from the sonar processing system is the last to be enhanced in the decision block 70 designated IS THIS THE LAST PIXEL TO BE ENHANCED?. A no response results in the control means 16 returning the process to block 52 to receive the next pixel value to be enhanced. If the last pixel value to be enhanced has been received, the control means is directed to the INPUT FIFO TO SYSTOLIC ARRAY INPUT DATA AT LEFT SIDE OF ARRAY block 76 via YES signal path 78.

The control means 16 immediately advances to the SHIFT CONTENTS RIGHT N TIMES block 80 which designates the process of providing the required timing signals via signal path 68 to the Input FIFO 14 and via signal path 82 to the PROCESSOR 84 (FIG. 7). comprising an array of SYSTOLIC ARRAY PROCESSORS 80, to shift the contents of the Input FIFO into the leftmost processor 24 in the top row, the pixel values then being shifted across the top row until each processing element in the top row is initialized with the most recent pixel intensity value for each respective BIN designated for enhancement.

The control means 16 advances to the "CORNER TURN" TO STORE DISTRIBUTED 4-6 BIT BINARY PIXEL VALUE IN MEMORY OF TOP ROW PE's block 86 (FIG. 7) to control the transfer of data from the Input FIFO 14 into the top row processing element 24. The control means process advances from block 86 at the bottom of FIG. 6 to the COMPUTE HORIZONTAL AVERAGE FOR EACH PROCESSING ELEMENT (PE) IN THE TOP ROW, block 88 located at the top of FIG. 7. The processing elements, such as processing elements 24, 26 and 28 each execute steps in a program to accomplish the required addition and division for the computation of the horizontal averages. All processing elements in all systolic arrays execute the same program steps concurrently.

The control means 16 then advances the control process to the COMPUTE VERTICAL AVERAGE FOR EACH PE IN TOP ROW, block 90. Each processing element in the top row calculates the average of all of the pixel intensity values in the respective column. The column average is stored in the respective processing element. All vertical averages are computed concurrently. The horizontal and vertical averages are computed at a processor clock rate selected to complete the required processing before the sonar processor makes data available for the next scan.

The control means 16 then advances the control process to the DISTRIBUTE PIXEL VALUE AND HORIZONTAL AND VERTICAL AVERAGES (BITS) 4-6 VERTICAL PE's PER PIXEL, block 92.

The process then advances to the SHIFT THE CONTENTS OF EACH COLUMN OF PE's RIGHT TO THE AUX PROCESSOR, block 94. The contents of the registers containing the pixel intensity value. the horizontal average and the vertical average in each processing element is right shifted to the corresponding registers in the right adjacent processing element. The rightmost column of processing elements 96, (FIG. 4) 98, 100, 102, 104, 106 shifting the contents of their respective registers into latch registers in the AUXILLIARY PROCESSOR 108. The AUXILLIARY PROCESSOR performs the functions characterized by the EVALUATE HORIZONTAL AND VERTICAL AVERAGES FOR EACH PE, & IDENTIFY EACH PIXEL TO BE DISPLAYED, BLOCK 110 (FIG. 7). The pixel intensity value for each processing element in the right most column is compared with the respective horizontal average and the difference is used to determine if the pixel intensity value will be enhanced. If the AUXILLIARY PROCESSOR program determines that the pixel intensity value will be enhanced, it also determines what the new value will be by noting the magnitude of the difference between horizontal and vertical averages. One method of enhancement that can be used requires quantization of the difference into full scale. ¾ scale, half scale and ¼ scale values.

The AUXILIARY PROCESSOR 108 and the steps for performing the sequential evaluation of the pixel intensity values in the right most column as the contents of the processor is shifted and circulated represents an auxiliary processor means for reading the respective row average and column average for each processing element in the jth column of the systolic processor and for loading the corresponding first column processing element with a corrected pixel value. The auxiliary processor means also shifts the average row value and the average column value from the corresponding jth column processing element into the corresponding first column processing element.

In one alternative embodiment, the corrected pixel values are selected from a table correlating corrected pixel value to calculated difference value determined from subtracting the pixel intensity value from the corresponding row average for the processing element. Unenhanced and the enhanced pixel intensity values from the data obtained from each of the right most column processing elements 96, 98, 100, 102, 104 and 106 are then circulated along with the respective horizontal and vertical averages and restored in the corresponding left most column of processing elements 24, 112, 114, 116, 118 and 120. The control means advances to the LOAD OUTPUT FIFO FROM AUX PROCESSOR, block 122 (FIG. 7) for the purpose of transferring the pixel intensity value from the rightmost bottom processing element 106 into the Output FIFO 54 for subsequent delivery to the Lofargram Recorder 8 via MUX 3B.

The control process then advances to the HAVE THE PROCESSOR COLUMNS BEEN RIGHT SHIFTED N TIMES? block 124 where N represents the number of BINS to be enhanced. If the answer is NO, the control means cycles back to an entry point for block 94. If the required number of right shift, enhance and circulated steps have been performed, the control means 16 advances to the DOWN SHIFT THE PIXEL VALUES FOR ALL PE's DISCARDING THE LAST ROW block 126. Down shifting the top row to the second row saves the most recent processed data and makes the top row available for the receipt of the next set of pixel intensity values from the sonar processor. The last row data has been previously sent to the Output FIFO 54 and will be shifted out to the Lofargram Recorder at the beginning of the next control means process at block 50 (FIG. 6). The control process then advances to the INITIALIZE FOR NEXT SCAN & RETURN TO START block 128. In this step, the counters are reset an the required registers are cleared in preparation for the start of the next cycle at block 32 in FIG. 6.

The operation of the control means 16 in accordance with the stored program functions of blocks 124 and 126 represent a column selection and timing and control circuit means for shifting the contents of the bottom row of corrected pixel values into an Output FIFO for delivery to a recorder as a scan line of data. These blocks also represent a timing and control circuit means for sequentially right shifting the systolic array one column to the right and for actuating the auxiliary processor means to calculate and enter corrected pixel values in each first column processing element, until all of the columns have been shifted to the jth column location. In addition, these blocks also represent a timing and control circuit means for shifting the contents of all corrected pixel values, row averages and column averages stored in the respective processing elements down one row, and for then commanding the means for receiving the next scan line of data, the Input FIFO 14 under control of the control means 16, to receive the next scan line of data.

The flow diagram of FIGS. 6 and 7 can also be regarded as the characterization of a process or method for a signal enhancement process in which blocks 32, 42, 52, and 70 represent the first step of:

(A) receiving a scan line of data comprising a sequence of pixel intensity signal values from a signal source, each respective pixel intensity signal value characterizing a signal amplitude at a BIN location.

Blocks 76, 80 and 86 represents the steps for the second step of:

(B) storing each pixel intensity signal in a top row processing element having a corresponding BIN location within a systolic processor having i rows and j BINS of processing elements, the processing elements in the jth column being the rightmost column of processing elements, the range of j corresponding to the number of pixels to be displayed on each scan of a recorder stylus.

Blocks 88, 90 and 92 represent the steps for the third step in the process or method of:

(C) concurrently calculating a row average value for the average of the pixel intensity signal values stored in a predetermined relative row array for each respective processing element and calculating a column average value for the average of the pixel intensity signal values stored in a predetermined relative column array for each respective processing element in the systolic processor.

Blocks 94, 110, and 122 represent the steps for the fourth step in the process or method of:

(D) reading the respective row average and column average for each processing element in the rightmost column of the systolic processor with an auxiliary processor and calculating the difference between the row average and the column average for each processing element, and determining if the difference exceeds a predetermined threshold, and if the difference crosses the threshold, deciding if the difference is positive, and if the cell value difference is positive deciding that the cell location contains a corrected pixel value, the corrected pixel values being selected from a table correlating corrected pixel value to calculated difference value, the corrected pixel values being stored back into the pixel intensity signal value for the corresponding processing element.

Blocks 124 and 126 represent the steps for the fourth step in the process or method of:

(E) determining if the systolic processor has been right shifted j times (where j is=to N) and if not, right shifting the systolic array one column to the right and repeating step (D), and if the systolic processor has been right shifted j times, shifting the contents of the bottom row of corrected pixel values out to the right into a FIFO for delivery to a recorder as a scan line of data, and shifting the contents of all corrected pixel values, row averages and column averages stored in the respective processing elements down one row, preparatory to receiving the next scan line of data and repeating step (A).

I claim:

1. A lofargram enhancement system comprising:

a systolic processor having 1 to i rows and 1 to j columns of processing elements, each processing element having a unique row and column location corresponding to its respective i-j index, each processing element having a computational capability and memory means for storing at least a pixel intensity value; the memory of all processing elements being addressable concurrently;

means, including said systolic processor, for receiving and storing successive digitized scan lines of sonar derived data comprising a sequence of pixel intensity signal values and for storing each respective received pixel intensity signal value in the respective first row location for each line and down shifting the stored signal values after the end of each scan line;

means, including said systolic processor, for calculating a row total value to determine the average of the pixel intensity signal values stored in a predetermined relational row array for each respective processing element and for calculating a column average value for the total of the pixel intensity signal values stored in a predetermined relational column array for each respective processing element in the systolic processor;

an auxiliary processor for reading the respective row total and column total for each processing element in the jth column of the systolic processor and for loading the corresponding first column processing element with a corrected pixel value, using the total row value and the total column value from the corresponding jth column processing element, the corrected pixel value being calculated as a function of the difference between the respective pixel intensity value and the corresponding row and column total values;

an output FIFO; and, column selection and timing and control circuit means for sequentially right shifting the systolic array one column to the right and for actuating the auxiliary processor means to calculate and enter corrected pixel values in each successive first column data processing element until a corrected pixel value has been inserted in each column position of the processing element, row totals and column totals being stored in the respective data processing elements, the contents of the bottom row of corrected pixel values being shifted into said output FIFO for delivery to a recorder as a scan line of data, the contents of all rows in the array of computing elements being down row shifted one row in preparation for commanding the means for receiving the next scan line of data to receive the next scan line of data in the top row of computing elements.

2. The lofargram enhancement system of claim 1 wherein each respective processing element further comprises memory registers in said memory means for storing said row total value and said column total value.

3. The lofargram enhancement system of claim 1 wherein the means for receiving and storing successive scan lines of data is further characterized to receive the intensity signal values from a sonar system in LOFAR format, and wherein each respective pixel intensity signal value characterizes a signal amplitude at a corresponding processing element first row and column location.

4. The lofargram enhancement system of claim 1 wherein the auxiliary processor means is further characterized to calculate the difference between the row average and the column average for each processing element in the jth column, and to determine if the difference exceeds a predetermined threshold, and if the difference exceeds the predetermined threshold, deciding that a corrected pixel value will be calculated for the respective processing element.

5. The lofargram enhancement system of claim 1 wherein the column selection and timing and control circuit means further comprises means for shifting the contents of the bottom row of corrected pixel values into said FIFO.

6. The lofargram enhancement system of claim 5 wherein the column selection and timing and control circuit means further comprises means for determining if the contents of the processing elements within the entire systolic processor have been right shifted j times and if not, for right shifting the systolic processor contents one column to the right and for actuating the auxiliary processor means to again calculate and enter corrected pixel values in each first column processing element.

7. A lofargram enhancement system comprising:
a systolic processor having 1 to j rows and 1 to i columns of processing elements, the range of j corresponding to the number of pixels to be displayed on each scan of a recorder stylus, each processing element having a location corresponding to its respective i-j index, each processing element having a computational capability and having memory means for storing a pixel intensity value, a row average value and a column average value;
means, including said systolic processor, for receiving a scan line of digitized sonar data comprising a sequence of pixel intensity signal values from an acoustic signal source, each respective pixel intensity signal value characterizing a signal amplitude at a corresponding row and column location and said processor storing each respective received pixel intensity signal value in the respective row 1 location;

program means including processor elements for calculating a row total value for the pixel intensity signal values stored in a predetermined relational row array of processing elements and for calculating a column total value for the total of the pixel intensity signal values stored in a predetermined relative column array for each respective processing element in the systolic processor;
an auxiliary processor for reading the respective row total and column total for each processing element in the jth column of the systolic processor and for scaling the pixel intensity value and for calculating the difference between the row total and the scaled pixel intensity value for each processing element in the jth column, and for determining if the difference between the row total and the scaled pixel intensity value exceeds a predetermined threshold, and if the difference exceeds the predetermined threshold, deciding if the difference is positive, and if the difference is positive, loading the corresponding first column processing element with a corrected pixel value, and with the average row value and the average column value from the corresponding jth column processing element, the corrected pixel values being selected from a table correlating corrected pixel value to calculated difference value;
a FIFO; and,
BIN selection and timing and control circuit means for right shifting the contents of the processing elements within the entire systolic processor j times and if not, for right shifting the systolic array one column to the right and actuating the auxiliary processor means to again calculate and enter corrected pixel values in each first column processing element and if the systolic processor has been right shifted j times, for shifting the contents of the bottom row of corrected pixel values into said FIFO for delivery to a recorder as a scan line of data, and for shifting the contents of all corrected pixel values, row averages and column averages stored in the respective processing elements down one row, and for commanding the means for receiving the next scan line of data to receive the next scan line of data.

8. A sonar signal enhancement process comprising the steps of:
(A) receiving, in an input FIFO, a scan line of data comprising a sequence of pixel intensity digital signal values from an acoustic signal processing source, each respective pixel intensity signal value characterizing a signal amplitude at a BIN location;
(B) storing each pixel intensity signal in a processing element in an array of processing elements comprising a systolic processor, each processing element having a location corresponding to a BIN location within the scan line of data received, the systolic processor being arranged into i rows and j BINS, or columns, of processing elements, the processing elements in the jth column being the rightmost column of processing elements, the range of j including the number of pixels to be enhanced and displayed on each scan of a recorder stylus;
(C) concurrently calculating a row total value for the total of the pixel intensity signal values stored in a predetermined relationally related row array for each respective processing element and calculating a column total value for the total of the pixel intensity signal values stored in a predetermined relationally related column array for each respective processing element in the systolic processor;

(D) reading the respective row total and column total for each processing element in the rightmost column of the systolic processor with an auxiliary processor, and calculating the difference between the row total and the column total for each processing element, and determining if the difference exceeds a predetermined threshold, and if the difference crosses the threshold, deciding if the difference is positive, and if the processing element value difference is positive deciding that the processing element location contains a corrected pixel value, the corrected pixel values being selected from a table correlating corrected pixel value to calculated difference value, the corrected pixel values being stored back into the pixel intensity signal value for the corresponding processing element;

(E) determining if the systolic processor has been right shifted j times and if not, right shifting the systolic array one column to the right and repeating step (D), and if the systolic processor has been right shifted j times, shifting the contents of the bottom row of corrected pixel values out to the right into a FIFO for delivery to a recorder as a scan line of data, and shifting the contents of all corrected pixel values, row averages and column averages stored in the respective processing elements down one row, preparatory to receiving the next scan line of data and repeating step (A).

* * * * *